(12) United States Patent
Harumoto et al.

(10) Patent No.: US 9,180,788 B2
(45) Date of Patent: Nov. 10, 2015

(54) FUEL-SAVING RATING DEVICE AND POWER AMOUNT MANAGEMENT DEVICE

(75) Inventors: Satoshi Harumoto, Kobe (JP); Kouei Kiyo, Kobe (JP); Shojiro Takeuchi, Tokyo-to (JP)

(73) Assignee: FUJITSU TEN LIMITED, Kobe (JP)

( * ) Notice: Subject to any disclaimer, the term of this patent is extended or adjusted under 35 U.S.C. 154(b) by 516 days.

(21) Appl. No.: 12/997,695

(22) PCT Filed: Jul. 24, 2009

(86) PCT No.: PCT/JP2009/063269
§ 371 (c)(1),
(2), (4) Date: Dec. 13, 2010

(87) PCT Pub. No.: WO2010/013652
PCT Pub. Date: Feb. 4, 2010

(65) Prior Publication Data
US 2011/0093152 A1 Apr. 21, 2011

(30) Foreign Application Priority Data
Jul. 31, 2008 (JP) .................. 2008-198384

(51) Int. Cl.
| | |
|---|---|
| B60L 9/00 | (2006.01) |
| B60L 11/00 | (2006.01) |
| G05D 1/00 | (2006.01) |
| G06F 17/00 | (2006.01) |
| B60L 15/20 | (2006.01) |
| B60W 10/08 | (2006.01) |
| B60W 10/26 | (2006.01) |
| B60L 11/18 | (2006.01) |
| B60W 20/00 | (2006.01) |

(52) U.S. Cl.
CPC .......... *B60L 15/2045* (2013.01); *B60L 11/184* (2013.01); *B60W 10/08* (2013.01); *B60W 10/26* (2013.01); *B60L 2240/60* (2013.01); *B60W 20/00* (2013.01); *B60W 2510/244* (2013.01); *B60W 2720/106* (2013.01); *Y02T 10/6269* (2013.01); *Y02T 10/7005* (2013.01); *Y02T 10/7283* (2013.01); *Y02T 10/7291* (2013.01); *Y02T 90/121* (2013.01); *Y02T 90/128* (2013.01); *Y02T 90/14* (2013.01); *Y02T 90/161* (2013.01); *Y02T 90/163* (2013.01); *Y02T 90/169* (2013.01); *Y04S 30/14* (2013.01)

(58) Field of Classification Search
USPC .............................. 701/45, 22, 54, 99, 70, 96
See application file for complete search history.

(56) References Cited

FOREIGN PATENT DOCUMENTS

| | | |
|---|---|---|
| JP | A-2007-210487 | 8/2007 |
| JP | A-2007-253727 | 10/2007 |
| JP | A-2007-256158 | 10/2007 |
| JP | A-2008-55963 | 3/2008 |
| JP | A-2009-35016 | 2/2009 |

OTHER PUBLICATIONS

Jul. 10, 2012 Japanese Office Action issued in Japanese Patent Application No. 2008-198384 (with translation).

*Primary Examiner* — Bhavesh V Amin
(74) *Attorney, Agent, or Firm* — Oliff PLC (57) ABSTRACT

A fuel-saving driving diagnostic device stores an external power amount which indicates an amount of power charged by an external device and an internal power amount which indicates an amount of power charged by vehicle driving. The fuel-saving driving diagnostic device calculates a driving power amount which indicates an amount of power required for vehicle driving based on the stored external power amount, stored internal power amount, and an amount of power a vehicle currently has, and makes a diagnosis of fuel-saving driving based on the calculated driving power amount and the stored external power amount. As a result, sufficient information is calculated for prompting the driver of a plug-in hybrid car to do the fuel-saving driving.

6 Claims, 5 Drawing Sheets

FIG.5

FUEL-SAVING RATING DEVICE AND POWER AMOUNT MANAGEMENT DEVICE

TECHNICAL FIELD

The present invention relates to a fuel-saving driving diagnostic device, an in-vehicle system, a drive control device, and a fuel-saving driving diagnostic program for making a diagnosis of fuel-saving driving of a driver of a vehicle which is driven by electric energy.

BACKGROUND ART

In recent years, global environmental issues such as measures against global warming have become focused. Carbon dioxide emission caused by the use of fossil fuel such as petroleum has come to an issue. In particular, emissions from gasoline-fueled automobiles and the like have been brought into question.

To address these issues, various electric automobiles have been developed to reduce emissions: for example, solar cars using solar cells as their power source, fuel-cell cars using fuel cells as their power source, hybrid cars using both gasoline and electricity (electric motor) have been developed.

The electric automobiles mentioned above are driven by a gasoline-fueled engine for running on the one hand, and recharge a battery that stores electric energy by driving the engine on the other. Recently, electric cars such as plug-in hybrid cars which can be recharged by plugging into a household wall socket without using an engine have been developed. However, emissions of these automobiles still cause serious problems. Hence, various technologies to help drivers of automobiles to reduce emission have been disclosed.

For example, a technology for calculating and displaying the driving efficiency of a hybrid car to its driver has been disclosed. This technology uses accelerations and instant fuel consumptions of the hybrid car calculated based on the driving distance and the fuel consumption thereof to calculate the driving efficiency (see, for example, Patent Document 1).
Patent Documents
Patent Document 1: Japanese Patent Application Laid-open No. 2007-253727

DISCLOSURE OF INVENTION

Problem to be Solved by the Invention

However, when applied to the plug-in hybrid car, this technology cannot take specific characteristics of the plug-in hybrid cars into account. Hence, the driving efficiency cannot be determined accurately and information obtained is not sufficient for prompting the driver to do the fuel-saving driving.

The present invention is made in view of the above-mentioned problem, and an object of the present invention is to provide a fuel-saving driving diagnostic device, an in-vehicle system, a drive control device, and a fuel-saving driving diagnostic program allowing the calculation of sufficient information for prompting the drivers of plug-in hybrid cars to do the fuel-saving driving.

Means for Solving Problem

According to one aspect of the present invention, a fuel-saving driving diagnostic device includes an external-power-amount storing unit that stores an external power amount which indicates an amount of power charged from an external device, an internal-power-amount storing unit that stores an internal power amount which indicates an amount of power charged by electricity generated by driving a vehicle, a driving-power-amount calculator that calculates a driving power amount which indicates an amount of power required for driving the vehicle, based on the external power amount stored in the external-power-amount storing unit, the internal power amount stored in the internal-power-amount storing unit, and an amount of power the vehicle currently has, and a fuel-saving driving diagnosing unit that makes a diagnosis of a fuel-saving driving based on the driving power amount calculated by the driving-power-amount calculator and the external power amount stored in the external-power-amount storing unit.

Effect of the Invention

According to the present invention, an advantageous effect can be obtained that sufficient information for prompting the driver of a plug-in hybrid car to do the fuel-saving driving can be calculated.

Further, according to the present invention, an amount of regenerative power which is generated by the vehicle driving is also stored. Therefore, it is possible to accurately determine how much power charged without the use of gasoline is consumed.

Further, according to the present invention, an internal power amount which is required for traveling alone can be calculated accurately. Therefore it is possible to determine how much internal power amount is used by the driver for traveling alone, in other words, it is possible to determine the power ratio with respect to the traveling by the driver.

Further, according to the present invention, the amount of power used by the traveling vehicle can be calculated accurately, and it is possible to determine how much internal power amount is used by the driver during traveling, in other words, it is possible to determine the power ratio with respect to the use by the driver.

Further, according to the present invention, the fuel-saving driving of the driver is rated based on the result of diagnosis of the fuel-saving driving of the driver, and it is possible to determine whether the driving is fuel-saving driving or not using information easily understood by the driver.

Further, according to the present invention, the advice on fuel-saving driving is notified to the driver based on the result of diagnosis. Therefore, the consciousness of the driver for the fuel-saving driving can be improved, and as a result, it is possible to prompt the driver even more to do the fuel-saving driving.

BEST MODE(S) FOR CARRYING OUT THE INVENTION

Exemplary embodiments of a fuel-saving driving diagnostic device, in-vehicle system, drive control device, and fuel-saving driving diagnostic program according to the present invention will be described in detail below. An overview, structure, and process flow of the operation of the fuel-saving driving diagnostic device according to the embodiment will be described in turn, and various modifications of the embodiment will be described in the end. Note that the embodiments should not be taken as limiting the invention.

First Embodiment

Overview of Fuel-saving Driving Diagnostic Device

Figure 1:
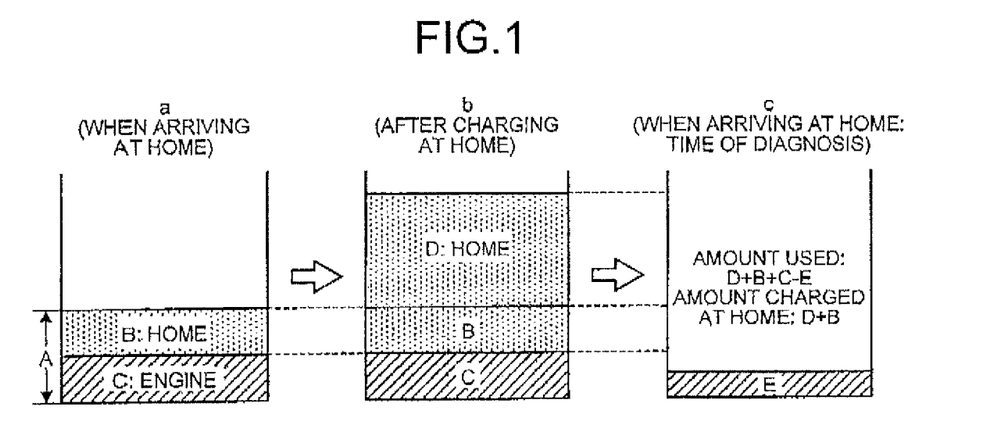
FIG. 1 is a diagram for explaining an outline of a fuel-saving driving diagnostic device according to a first embodiment.

Firstly, the overview of the fuel-saving driving diagnostic device according to the first embodiment will be described with reference to FIG. 1. FIG. 1 is a diagram for explaining the overview of the fuel-saving driving diagnostic device according to the first embodiment. As illustrated in FIG. 1, a fuel-saving driving diagnostic device 10 according to the first embodiment is a device to be installed in an in-vehicle system of electric automobiles such as plug-in hybrid cars, and makes a diagnosis of the fuel-saving driving of the driver.

An in-vehicle system 1 includes the fuel-saving driving diagnostic device 10 which is connected to a speaker 16 for outputting sounds inside the vehicle and a car navigation device 17 which supports the driving by a person sitting, for example, in the driver's seat, and a HV traveling control device 20 which is connected to the fuel-saving driving diagnostic device 10 via a bus 100 and controls the driving of the vehicle in various manners. The fuel-saving driving diagnostic device 10 as illustrated is merely an example for describing the present invention. Hence, the fuel-saving driving diagnostic device is not limited to the illustrated one, and may include various devices mounted on a vehicle, such as an air conditioner and an air purification system.

The fuel-saving driving diagnostic device 10 stores an external power amount which indicates the amount of power charged by an external device, for example, at home, and an internal power amount which indicates the amount of power charged by the vehicle driving. The fuel-saving driving diagnostic device 10 calculates a driving power amount which indicates the amount of power that has been required for driving the vehicle based on the stored external power amount, stored internal power amount, and the amount of power the vehicle currently has. The fuel-saving driving diagnostic device 10 makes a diagnosis of the fuel-saving driving of the driver based on the calculated driving power amount and the external power amount. Therefore, the fuel-saving driving diagnostic device 10 can calculate sufficient information for prompting the driver of the plug-in hybrid car to do the fuel-saving driving.

Assume that the amount of remaining power of the vehicle when the vehicle returns home after leaving home and driving is the sum of an external power amount (B) charged at home and an internal power amount (C) charged by the engine as illustrated in (a) of FIG. 1. The driver then charges the vehicle at home to increase the external power amount by the amount (D) as illustrated in (b) of FIG. 1. The fuel-saving driving diagnostic device 10 in this state stores the external power amount of the vehicle as (B+D), and the internal power amount as (C).

Then, assume that the vehicle with the remaining power as described above goes out and returns home again. The fuel-saving driving diagnostic device 10 calculates the driving power amount (D+B+C−E) which indicates the amount of power consumed for driving the vehicle based on the stored internal power amount (C), the stored external power amount (B+D), and the amount of remaining power (E) at the time the vehicle returns home as illustrated in (c) of FIG. 1. The fuel-saving driving diagnostic device 10 further calculates (external power amount D+B/driving power amount D+B+C−E), and uses the result of calculation <(D+B)/(D+B+C−E)> as the result of diagnosis of the fuel-saving driving of the driver.

The fuel-saving driving diagnostic device 10 according to the first embodiment can calculate how much of the power consumed for the traveling is the power charged without the use of gasoline, i.e., charged at facilities such as home. Thus, the fuel-saving driving diagnostic device 10 according to the first embodiment can calculate sufficient information for prompting the driver of the plug-in hybrid car to do the fuel-saving driving.

Structure of Fuel-saving Driving Diagnostic Device

Figure 2:
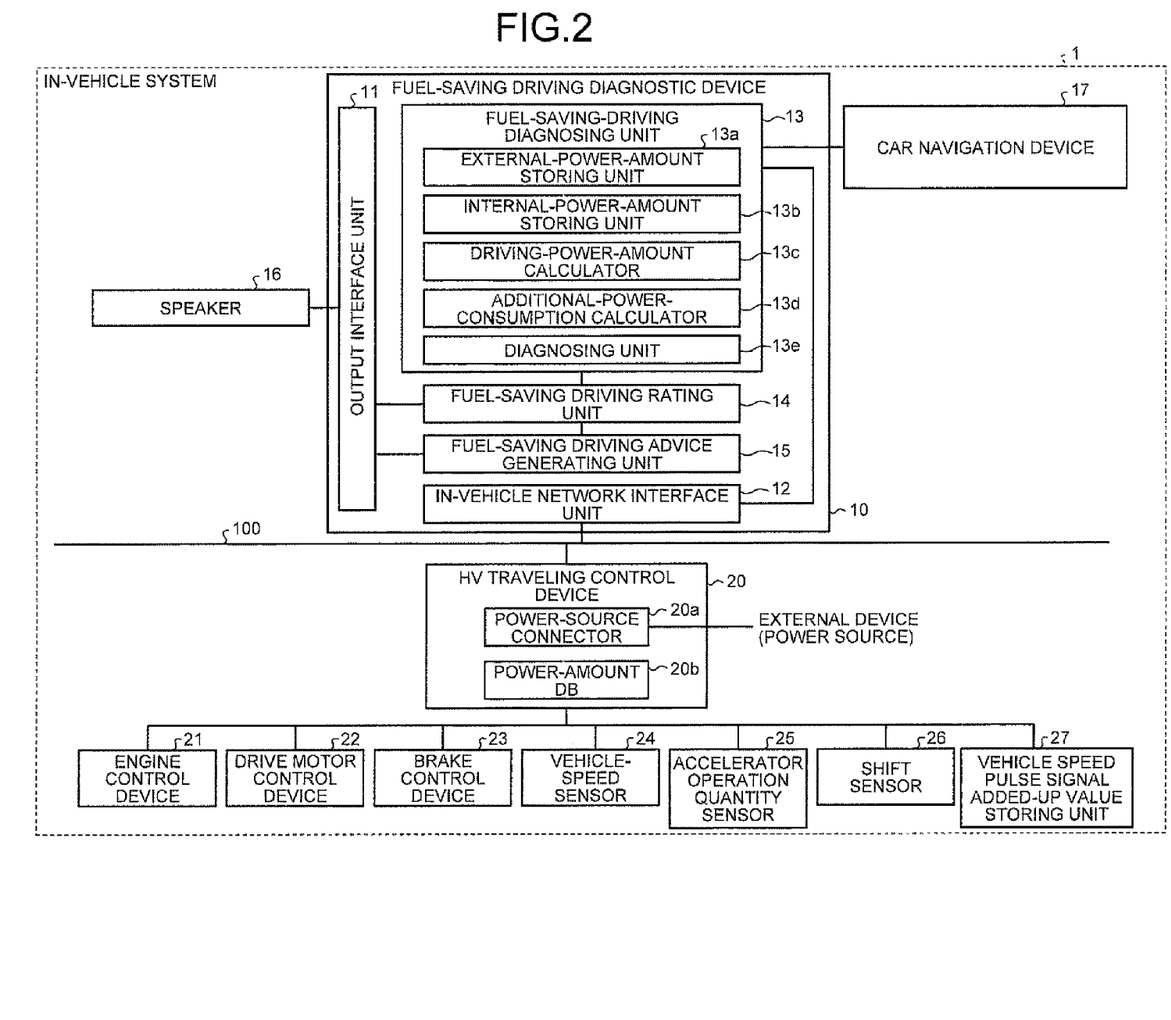
FIG. 2 is a block diagram of an in-vehicle system including the fuel-saving driving diagnostic device according to the first embodiment.

The structure of the fuel-saving driving diagnostic device according to the first embodiment will be described with reference to FIG. 2. FIG. 2 is a block diagram of an in-vehicle system including the fuel-saving driving diagnostic device according to the first embodiment.

As illustrated in FIG. 2, the in-vehicle system 1 includes the fuel-saving driving diagnostic device 10, the speaker 16, the car navigation device 17, the HV (hybrid) traveling control device 20, an engine control device 21, a drive motor control device 22, a brake control device 23, a vehicle-speed sensor 24, an accelerator operation quantity sensor 25, a shift sensor 26, and a vehicle speed pulse signal added-up value storing unit 27.

The speaker 16 receives inputs of various types of sound signals from the fuel-saving driving diagnostic device 10 to output the sound in the vehicle; and receives inputs of various types of sound signals from a radio or music players not shown to output the sound in the vehicle. The car navigation device 17 is a common car navigation device that includes a touch panel, liquid crystal display, or the like, to display map information, road information, and the like, and output information related to a road on which the vehicle is currently traveling to the fuel-saving driving diagnostic device 10 based on the stored map information and the road information.

Structure of Fuel-saving Driving Diagnostic Device 10

The fuel-saving driving diagnostic device 10 includes an output interface unit 11, an in-vehicle network interface unit 12, a fuel-saving driving diagnosing unit 13, a fuel-saving driving rating unit 14, and a fuel-saving driving advice generating unit 15.

The output interface unit 11 is an interface which controls communication of various pieces of information exchanged between the fuel-saving driving diagnostic device 10 and the speaker 16. For example, the output interface unit 11 receives fuel-saving driving diagnosis result of a driver output from the fuel-saving driving diagnosing unit 13 mentioned later, a fuel-saving driving rating result of a driver output from the fuel-saving driving rating unit 14, and a fuel-saving driving advice for a driver output from the fuel-saving driving advice generating unit 15, and outputs these to the speaker 16.

The in-vehicle network interface unit 12 is an interface which controls communication related with various pieces of information exchanged between the fuel-saving driving diagnostic device 10 and the HV traveling control device 20 mentioned later. For example, the in-vehicle network interface unit 12 receives various types of requests output from the fuel-saving driving diagnostic device 10 (such as an acquisition request of various types of power amounts, an acquisition request of engine revolutions/speed) to output these to the HV traveling control device 20, and receives various types of responses output from the HV traveling control device 20 (such as power amount information, and engine revolution information) to output these to the fuel-saving driving diagnostic device 10.

The fuel-saving driving diagnosing unit 13 is a control unit which makes diagnosis of fuel-saving driving of a driver of a vehicle which is driven by electric energy. The fuel-saving driving diagnosing unit 13 includes, as elements particularly relevant to the present invention, an external-power-amount storing unit 13a, an internal-power-amount storing unit 13b, a driving-power-amount calculator 13c, an additional-power-consumption calculator 13d, and a diagnosing unit 13e.

The external-power-amount storing unit 13a stores the external power amount which indicates the amount of power charged by an external device. Particularly, the external-power-amount storing unit 13a acquires the external power amount which indicates the amount of power charged by an external device, for example, at home, from the amounts of power stored in a power-amount database (DB) 20b of the HV traveling control device 20 mentioned later, and stores the acquired amount. Further, the external-power-amount storing unit 13a stores the external power amount charged via a power-source connector 20a of the HV traveling control device 20 and stored in the power-amount DB 20b. Further, the external power-amount storing unit 13a may store the amount of regenerated power which is generated by a motor, which serves as a power generator, at the time of deceleration. For example, when the power-amount DB 20b stores power amount "A" of which power amount "B" is the amount of power charged at home and power amount "D" is the external power amount charged via the power-source connector 20a and stored in the power-amount DB 20b, the external-power-amount storing unit 13a stores "B+D" as the external power amount.

The external power means efficiently generated power and thus has a little negative effect on environment. When the vehicle uses the external power, positive evaluation is given as a result of fuel-saving driving evaluation.

The internal-power-amount storing unit 13b stores the internal power amount which indicates the amount of power generated by the driving of the vehicle. Specifically, the internal-power-amount storing unit 13b acquires the internal power amount which indicates the amount of power charged by the driving of a gasoline-fueled engine and the resulting vehicle traveling, from the amount of power stored in the power-amount DB 20b of the HV traveling control device 20 mentioned later, and stores the acquired amount. For example, when the power-amount DB 20b stores the power amount "A" of which power amount "C" is the amount of power charged by the vehicle traveling, the internal-power-amount storing unit 13b stores "C" as the internal power amount.

The internal power is generated by driving the engine. Because it is generated using the engine, the internal power is not preferable in terms of eco-friendly driving. Hence, when the vehicle uses the internal power, negative evaluation is given as a result of fuel-saving driving evaluation.

The driving-power-amount calculator 13c calculates the driving power amount which indicates the amount of power required for driving the vehicle, based on the external power amount stored in the external-power-amount storing unit 13a, the internal power amount stored in the internal-power-amount storing unit 13b, and the amount of power currently held by the vehicle. More specifically, when the external-power-amount storing unit 13a acquires the external power amount "B+D", the internal-power-amount storing unit 13b acquires the internal power amount "C", and the amount of power currently held by the vehicle is "G", the driving-power-amount calculator 13c calculates "B+D+C−G" as the driving power amount indicating the amount of power required for driving the vehicle.

Figure 3:
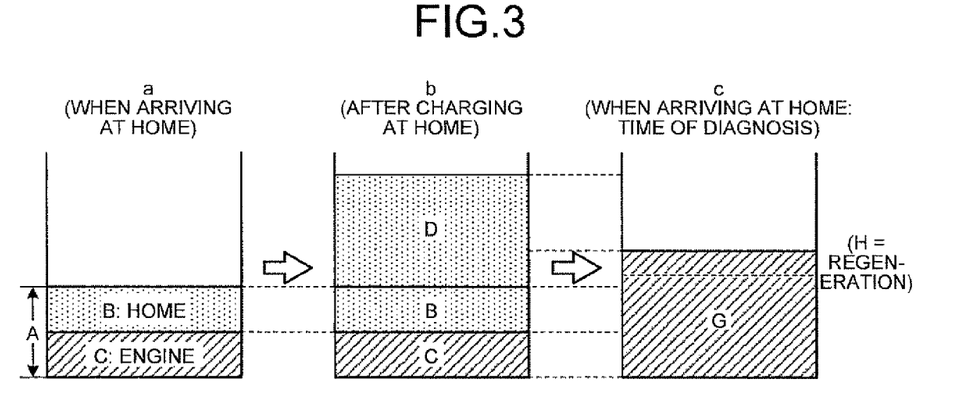
FIG. 3 is a diagram illustrating an exemplary manner of driving power amount calculation.

When the amount of power the vehicle currently holds is "G", in other words, when the vehicle consumes all the external power and travels as charging power, the driving-power-amount calculator 13c can calculates the driving power amount accurately. Assume that the vehicle arrives at home to find the internal power amount to be "B" and the external power amount to be "C" as illustrated in (a) of FIG. 3; the vehicle is charged with the power of the amount "D" at home as illustrated in (b) of FIG. 3 and runs again; and after that, the amount of external power remains in the vehicle is "G" as illustrated in (c) of FIG. 3. In this case, the external power amount is "B+D", the internal power amount is "C+G", and the amount of power the vehicle currently has is "G". Hence, the driving-power-amount calculator 13c calculates the driving power amount "D+B+C−G" as an amount required for vehicle driving. FIG. 3 depicts an example of calculation of the driving power amount.

The driving-power-amount calculator 13c may calculate the driving power amount at various timing; for example, when the vehicle comes back to a starting point, e.g., home and is parked, when the driver performs operation to start calculation, or when the internal power is about to be depleted. The timing can be set by the user.

The additional-power-consumption calculator 13d calculates the amount of additional power consumption which indicates the amount of power consumed by other in-vehicle devices mounted on the vehicle. In particular, the additional-power-consumption calculator 13d acquires the amount of power consumed by in-vehicle devices such as an air conditioner, audio device, and lighting mounted on the vehicle, and calculates the amount of additional power consumption.

The diagnosing unit 13e makes a diagnosis of the fuel-saving driving of the driver based on the driving power amount calculated by the driving-power-amount calculator 13c and the external power amount stored in the external-power-amount storing unit 13a. For example, the diagnosing unit 13e can make a diagnosis on how much of the power charged at home is consumed for vehicle driving by substituting the driving power amount "D+B+C−G" calculated by the driving-power-amount calculator 13c, and the external power amount "B+D" acquired by the external-power-amount storing unit 13a into equation 1. Further, the diagnosing unit 13e stores the result of diagnosis (result of calculation of equation 1) in a memory not shown, and notifies the result to the fuel-saving driving rating unit 14. The result of diagnosis is indicated by a high numerical value when the rate of the external power amount is high in the amount of power consumed for driving, i.e., when most of the power used for running is the external power, because in equation 1, the amount of external power charged at home or the like is divided by the amount of power consumed for driving.

Equation 1

$$\text{Diagnosis} = \text{Amount of power charged at home or the like} / \text{Amount of power consumed for driving} \quad (1)$$

The fuel-saving driving rating unit 14 rates the fuel-saving driving of the driver based on the result of diagnosis by the diagnosing unit 13e. For example, the fuel-saving driving rating unit 14 substitutes the driving power amount "D+B+

C–G" calculated by the driving-power-amount calculator 13c and the external power amount "B+D" acquired by the external-power-amount storing unit 13a into equation 2, rates how much power charged at home or the like is consumed for driving, and stores the rating result in a memory not shown. The fuel-saving driving rating unit 14 rates the fuel-saving driving of the driver by multiplying the result of diagnosis by the diagnosing unit 13e by 100. Therefore, the rating result is indicated by a high numerical value when the rate of the external power amount is high in the power amount consumed in the driving, in other words, when most of the power consumed for running is the external power.

Equation 2

$$\text{Rating} = (\text{Amount of power charged at home or the like}/\text{Amount of power consumed for driving}) \times 100 \quad (2)$$

The fuel-saving driving advice generating unit 15 notifies the driver of an advice for fuel-saving driving based on the result of diagnosis by the diagnosing unit 13e. More specifically, the fuel-saving driving advice generating unit 15 acquires the result of diagnosis by the diagnosing unit 13e from a memory or the like, and formulates and notifies a message corresponding to the result to the driver. For example, when the result of diagnosis is "0.2", the fuel-saving driving advice generating unit 15 formulates a message "Try Eco-driving" or the like. When the result of diagnosis is "0.8", the fuel-saving driving advice generating unit 15 formulates a message "Keep on Eco-driving" or the like. Then, the fuel-saving driving advice generating unit 15 notifies the fuel-saving driving advice to the driver.

Further, the fuel-saving driving advice generating unit 15 may notify the driver of advice for fuel-saving driving based on the rating result given by the fuel-saving driving rating unit 14. More specifically, when the rating result is "20", the fuel-saving driving advice generating unit 15 formulates a message "Eco-driving grade is 20. Try Eco-driving." When the rating result is "80", the fuel-saving driving advice generating unit 15 formulates a message "Eco-driving grade is 80. Keep on Eco-driving." Then, the fuel-saving driving advice generating unit 15 notifies the fuel-saving driving advice to the driver.

The fuel-saving driving advice generating unit 15 may formulate the message using formats each associated with a rate calculated by the diagnosing unit 13e and/or a rating result given by the fuel-saving driving rating unit 14. The fuel-saving driving advice generating unit 15 may compare the rate and/or the rating with a threshold value and select "message A" or "message B". An example of format may be "Eco-driving grade is XX. Try Eco-driving." The format can be stored in a memory. When threshold is used for comparison, "message A" and "message B" may be stored in a memory respectively corresponding to a case when the score result is less than threshold A and a case when the score result is equal to or higher than threshold B. The fuel-saving driving advice generating unit 15 may compare the rating result given by the fuel-saving driving rating unit 14 with the threshold, selects and notifies the message.

Thus, it is possible to select messages in more subtle manner and to more strongly prompt the driver to do the fuel-saving driving. In the above example, two thresholds A and B are employed for message selection. In the message selection, however, three or more thresholds may be employed.

Configuration of HV Traveling Control Device 20 and Other Devices

Next explained are the HV traveling control device 20 which controls the driving of the vehicle in various manners, and devices connected to the HV traveling control device 20. Devices connected to the HV traveling control device 20 are, an engine control device 21, a drive motor control device 22, a brake control device 23, a vehicle-speed sensor 24, an accelerator operation quantity sensor 25, a shift sensor 26, and a vehicle speed pulse signal added-up value storing unit 27.

The HV traveling control device 20 performs overall control of the HV traveling control. The HV traveling control device 20 acquires various types of information from each connected device to output the information to the fuel-saving driving diagnostic device 10. The HV traveling control device 20 includes the power source connector 20a and the power-amount DB 20b. The HV traveling control device 20 may acquire and output/notify information to the fuel-saving driving diagnostic device 10 at various timings: for example, when the HV traveling control device 20 receives an acquisition request from the fuel-saving driving diagnostic device 10, when periodical timing comes, or when previously set timing comes (e.g., when the vehicle speed becomes zero). Information output to the fuel-saving driving diagnostic device 10 after the acquisition of various types of information by the HV traveling control device 20 is, for example, the external power amount, internal power amount, vehicle speed, engine revolution, select lever signal, and accelerator operation quantity (i.e., accelerator opening).

The HV traveling control device 20 acquires various types of information from the engine control device 21, the drive motor control device 22, the brake control device 23, the vehicle speed sensor 24, the accelerator operation quantity sensor 25, the shift sensor 26, vehicle speed pulse signal added-up value storing unit 27, and the like, to control the vehicle driving. For example, when the power-amount DB 20b stores the power, the HV traveling control device 20 controls the drive motor control device 22 to use electric energy. When the power-amount DB 20b does not store the power, the HV traveling control device 20 controls the engine control device 21 to use gasoline in a gasoline tank not shown as energy.

The power source connector 20a is a connecting unit for charging the power from external devices. Specifically, the power source connector 20a is connected to the external device such as a receptacle at home or a dedicated charger for a plug-in hybrid car, and receives power supply. Supplied power is stored in the power-amount DB 20b mentioned later. The power source connector 20a notifies the external-power-amount storing unit 13a of the amount of supplied power.

The power-amount DB 20b stores the external power amount indicating the amount of power charged from external devices, and the internal power amount indicating the amount of power charged through vehicle driving. Specifically, the power-amount DB 20b stores the external power amount charged via the power source connector 20a, and the internal power amount charged through the driving of the engine control device 21. The power-amount DB 20b may store the external power amount and the internal power amount together, or in separate areas.

The engine control device 21 controls the gasoline engine which drives the vehicle. More specifically, the engine control device 21 receives a request to increase the engine revolutions, a request to decrease the engine revolutions each notified by the HV traveling control device 20, and controls the engine revolution correspondingly.

The drive motor control device 22 controls the motor which drives the vehicle using electric energy. Specifically, the drive motor control device 22 drives the motor using the electricity as stored in the power-amount DB 20b to control the vehicle traveling based on a motor-control notice from the HV traveling control device 20.

The brake control device 23 is connected to a braking pedal (not shown) of the vehicle or the like, to control the mechanical brake according to the braking operation of the driver. Further, the brake control device 23 controls the mechanical brake so that the brake acts as regeneration brake according to the shift lever operation of the driver. The vehicle-speed sensor 24 detects a current speed of the vehicle. Specifically, the vehicle-speed sensor 24 detects a current speed of the vehicle as displayed on a speed meter and outputs the same to the HV, traveling control device 20.

The accelerator operation quantity sensor 25 detects a current amount of accelerator operation by the driver. Specifically, the accelerator operation quantity sensor 25 is connected to an accelerator pedal (not shown) or the like of the vehicle, detects the accelerator operation quantity according to the accelerator operation by the driver, and outputs the detected amount to the HV traveling control device 20.

The shift sensor 26 detects the position of a shift lever (select lever) of the vehicle. Specifically, the shift sensor 26 is connected to the shift lever not shown of the vehicle, detects the shift lever according to the shift lever operation of the driver, and outputs a range signal indicating the detected shift lever to the HV traveling control device 20.

The vehicle speed pulse signal added-up value storing unit 27 stores the vehicle speed pulse signal added-up value. The vehicle speed pulse signal added-up value is a value obtained by adding up each vehicle-speed pulse signal detected for each revolution of the vehicle wheel by a pulse sensor provided to the inner periphery of the vehicle wheel. In other words, the vehicle speed pulse signal added-up value is a value obtained by adding up the number of wheel revolutions. By calculating the vehicle speed pulse signal added-up value for a predetermined time period and multiplying the same by the length of the outer circumference of the vehicle wheel, the running distance of the vehicle for the predetermined time period can be known. Further, the vehicle speed pulse signal added-up value storing unit 27 outputs the calculated traveling distance of the vehicle to the HV traveling control device 20.

Process by Fuel-saving Driving Diagnostic Device

Figure 4:
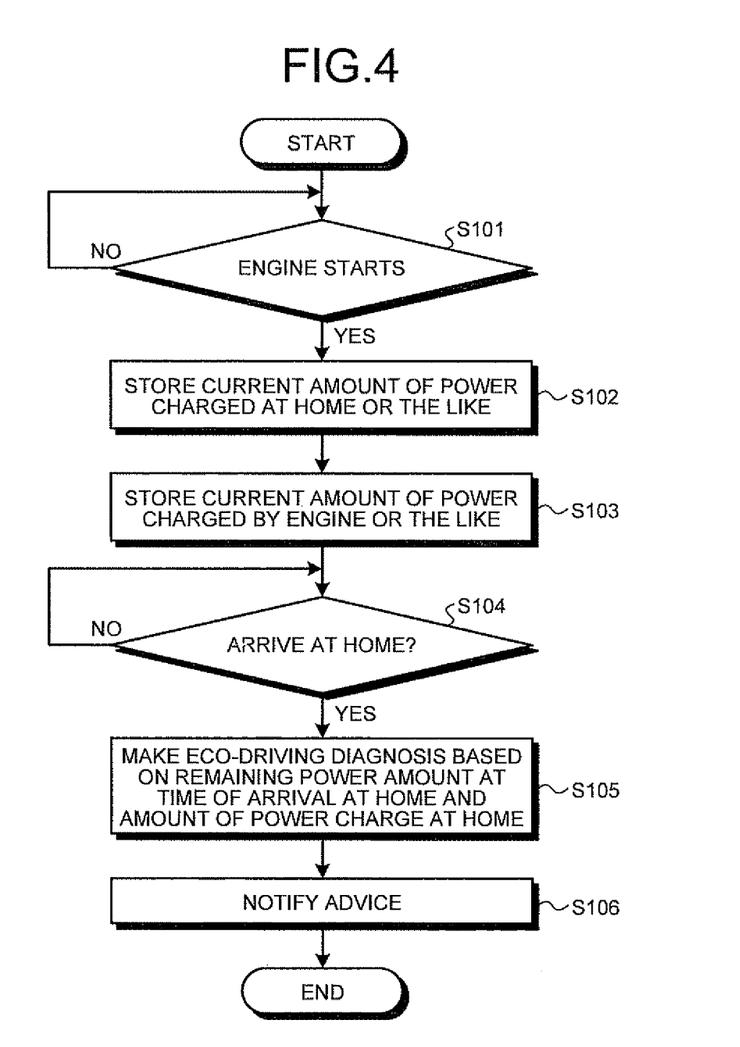
FIG. 4 is a flowchart illustrating a process flow of a fuel-saving driving diagnostic process performed by the fuel-saving driving diagnostic device according to the first embodiment.

With reference to FIG. 4, the process performed by the fuel-saving driving diagnostic device according to the first embodiment will be described. FIG. 4 is a flowchart illustrating the flow of the fuel-saving driving diagnosis process by the fuel-saving driving diagnostic device according to the first embodiment.

As illustrated in FIG. 4, when the fuel-saving driving diagnostic device 10 detects the staring up of the vehicle engine (YES in S101), the fuel-saving driving diagnostic device 10 acquires and stores a current amount of external power obtained through charging at home from the power-amount DB 20b (S102), and acquires and stores a current amount of internal power obtained through charging by gasoline-fueled engine or the like from the power-amount DB 20b (S103).

Thereafter, when the fuel-saving driving diagnostic device 10 detects the return of the vehicle to the home, i.e., the parking of the vehicle or the like based on the vehicle speed (YES in S104), the fuel-saving driving diagnostic device 10 calculates the driving power amount used for driving based on the remaining power amount at the time of arrival at home, acquires the external power amount previously stored, and divides the acquired external power amount by the driving power amount, thus making an eco-driving diagnosis (S105).

Then, the fuel-saving driving diagnostic device 10 notifies an advice for fuel-saving driving to the driver based on the result of eco-driving diagnosis, i.e., "external power amount/driving power amount" (S106).

Effect of First Embodiment

According to the first embodiment, the fuel-saving driving diagnostic device 10 calculates the driving power amount which indicates the amount of power required for vehicle driving based on the external power amount, the internal power amount, and the amount of power the vehicle currently has, and makes a diagnosis of the fuel-saving driving of the driver based on the calculated driving power amount and the external power amount. As a result, the fuel-saving driving diagnostic device 10 can calculate how much of the power charged from facilities such as home without the use of gasoline is used in the power used for vehicle running. Thus, the fuel-saving driving diagnostic device 10 can calculate sufficient information for prompting the driver of a plug-in hybrid car to do the fuel-saving driving.

Further, according to the first embodiment, the fuel-saving driving diagnostic device 10 stores a regenerative power amount that is the amount of power generated at the time of vehicle deceleration. Therefore, it is possible to accurately determine how much of the power charged without the use of gasoline is consumed.

Further, according to the first embodiment, the fuel-saving driving diagnostic device 10 rates the fuel-saving driving of the driver based on the result of diagnosis of the fuel-saving driving of the driver. Therefore, it is possible to determine whether the driving is fuel-saving one or not using information easily understood by the driver. As a result, further prompting of the fuel-saving driving can be achieved.

Further, according to the first embodiment, the fuel-saving driving diagnostic device 10 notifies the advice for fuel-saving driving to the driver based on the result of diagnosis. Therefore, it is possible to improve the driver's consciousness for the fuel-saving driving, and thus to further prompt the driver to do the fuel-saving driving.

Second Embodiment

The first embodiment of the present invention has been described so far. The present invention, however, can be realized in various different modes other than that already described above. In the following, (1) manner of advice formulation, (2) manner of diagnosis, (3) functional configuration, (4) system configuration, and (5) program will be described in separate sections based on different embodiments.

(1) manner of advice formulation

In the first embodiment, the advice is notified to the driver as a sound. The present invention is not limited to this example. For example, the advice may be formulated as image data, and displayed on the car navigation device 17 or a head-up display not shown.

(2) manner of diagnosis

The fuel-saving driving diagnostic device 10 disclosed by the present application may calculate the amount of additional power consumption indicating the amount of power consumed by other in-vehicle devices mounted on the vehicle. Then, the fuel-saving driving diagnostic device 10 may make a diagnosis of the fuel-saving driving of the driver based on the calculated driving power amount and the amount of power obtained by subtracting the amount of additional power consumption from the external power amount.

More specifically, the fuel-saving driving diagnostic device 10 calculates the amount of additional power consumption using the additional-power-consumption calculator 13d by acquiring the amount of power consumed by the in-vehicle devices such as air conditioner, audio device, and lighting mounted on the vehicle. Then, the fuel-saving driving diagnostic device 10 subtracts the amount of additional power consumption from the external power amount indicating the amount of power charged at home or the like as represented in equation 3 to make diagnosis of the fuel-saving driving of the driver. Thus, the fuel-saving driving diagnostic device 10 can accurately calculate the internal power amount required for traveling alone, and determine how much internal power is used by the driver for traveling, i.e., determine the rate of power with respect to the traveling by the driver. As a result, the fuel-saving driving diagnostic device 10 can make a diagnosis of the fuel-saving driving of the driver more accurately.

Equation 3

$$\text{Rating} = \{(\text{Amount of power charged at home} - \text{amount of additional power consumption})/\text{amount of power consumed for driving}\} \times 100 \quad (3)$$

Further, the fuel-saving driving diagnostic device 10 can make a diagnosis of the fuel-saving driving of the driver based on the amount of power obtained by adding the amount of additional power consumption to the calculated driving power amount, and the external power amount. Specifically, the fuel-saving driving diagnostic device 10 makes a diagnosis of the fuel-saving driving of the driver using the amount of power obtained by adding the amount of additional power consumption to the calculated driving power amount as represented by equation 4. Then, the fuel-saving driving diagnostic device 10 can calculate the amount of power consumed by the running vehicle accurately, and determine how much internal power is used for the traveling by the driver, i.e., the rate of power amount with respect to the use by the driver. As a result, the fuel-saving driving diagnostic device 10 can make a diagnosis of the fuel-saving driving of the driver more accurately.

Equation 4

$$\text{Rating} = \{\text{Amount of power charged at home or the like}/(\text{amount of power consumed for driving} + \text{amount of additional power consumption})\} \times 100 \quad (4)$$

(3) Functional configuration

Figure 5:
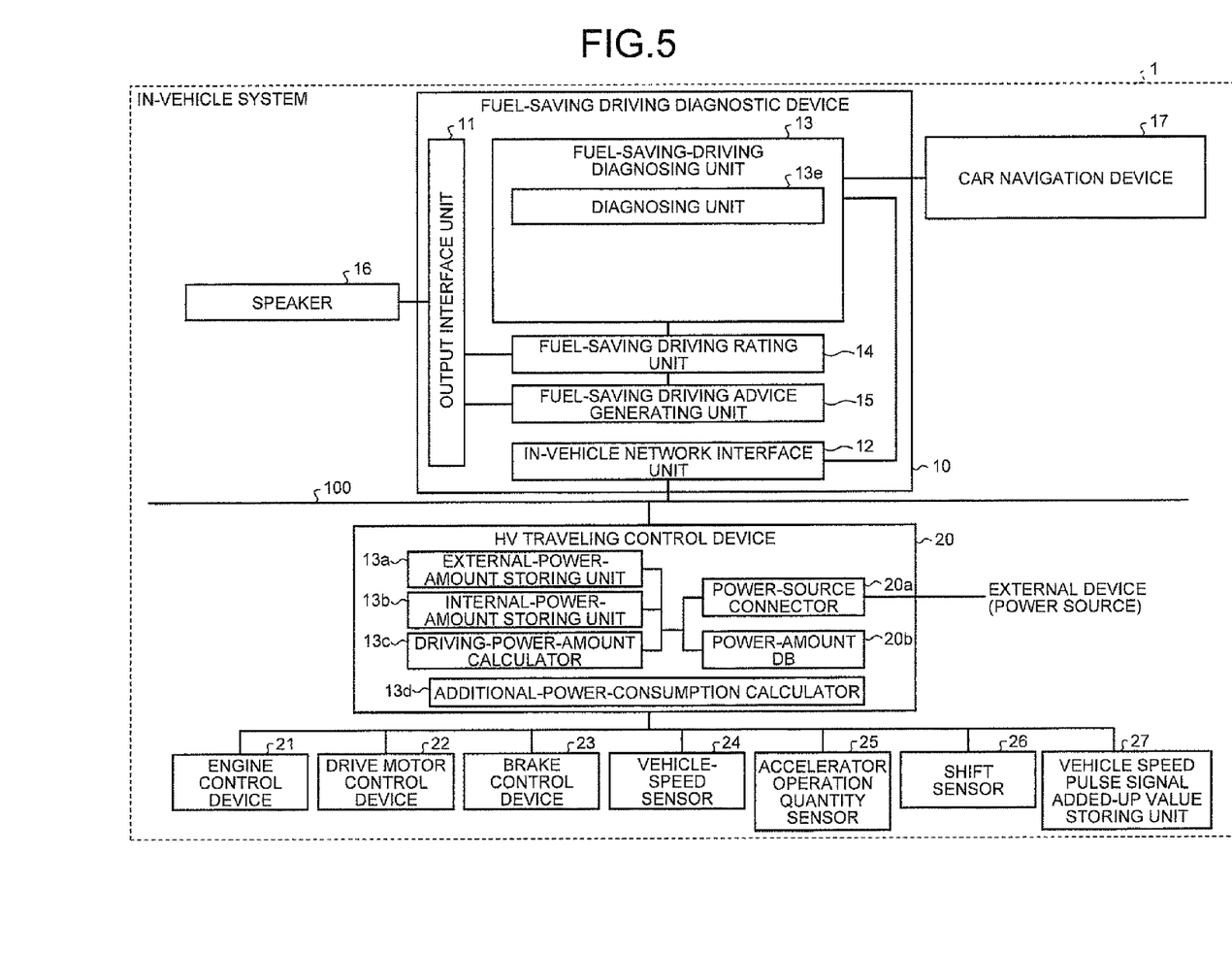
FIG. 5 is a diagram illustrating an example of an in-vehicle system whose fuel-saving driving diagnostic functions are distributed therein.

In the first embodiment, the fuel-saving driving diagnostic device 10 includes the external-power-amount storing unit 13a, the internal-power-amount storing unit 13b, the driving-power-amount calculator 13c, the additional-power-consumption calculator 13d, and the diagnosing unit 13e. The present invention, however, is not limited to this configuration, and does not need to have all the functions described above. For example, the functions may be divided by the fuel-saving driving diagnosing unit 13 and the HV traveling control device 20. For example, as illustrated in FIG. 5, the diagnosing unit 13e may be arranged in the fuel-saving driving diagnosing unit 13, while the external-power-amount storing unit 13a, the internal-power-amount storing unit 13b, the driving-power-amount calculator 13c, and the additional-power-consumption calculator 13d are arranged in the HV traveling control device 20. FIG. 5 illustrates an example of the in-vehicle system having a fuel-saving driving diagnosis function in a distributed manner.

The in-vehicle system 1 does not need to include the fuel-saving driving diagnosing unit 13 and the HV traveling control device 20 as separate units as illustrated in FIG. 1. For example, the HV traveling control device 20 may be embedded in the fuel-saving driving diagnosing unit 13.

(4) System configuration

The processes described above as automatically performed process according to the embodiment may be entirely or partially performed manually. Further, the process procedures, control procedures, specific names, information including data and parameters described above and in the drawings may be changed as necessary, if not specified otherwise.

The constituent elements of each device illustrated are functional and conceptual, and do not necessarily physically be arranged as illustrated. In other words, specific manner of distribution and integration of constituent elements are not limited to those illustrated, and all or a part of the elements can be functionally or physically divided and integrated in any units as needed according to the load and use conditions (for example, the external-power-amount storing unit 13a and the internal-power-amount storing unit 13b can be integrated). Further, all or a part of the process functions of each device may be realized by a CPU (central processing unit) and a program analyzed and executed by the CPU, or by hardware with wired logic.

(5) Program

The method of fuel-saving driving diagnosis described according to the embodiment can be performed by a computer such as a personal computer or a workstation by running a previously prepared program. The program may be distributed via a network such as Internet. The program may be stored in a computer-readable storage medium such as hard disk, flexible disc (FD), CD-ROM, MO, and DVD, and read and run by a computer.

INDUSTRIAL APPLICABILITY

The fuel-saving driving diagnostic device, the in-vehicle system, the drive control device, and the fuel-saving driving diagnosis program according to the present invention are useful for making a diagnosis of the fuel-saving driving of the driver of a vehicle which is driven by electric energy, and in particular, suitable for calculating sufficient information for prompting the driver of a plug-in hybrid car to do the fuel-saving driving.

EXPLANATIONS OF LETTERS OR NUMERALS

1 In-vehicle system
10 Fuel-saving driving diagnostic device
11 Output interface unit
12 In-vehicle network interface unit
13 Fuel-saving driving diagnosing unit
13a External-power-amount storing unit
13b Internal-power-amount storing unit
13c Driving-power-amount calculator
13d Additional-power-consumption calculator
13e Diagnosing unit
14 Fuel-saving driving rating unit
15 Fuel-saving driving advice generating unit
16 Speaker
17 Car navigation device
20 HV traveling control device
20a Power-source connector
20b Power-amount DB
21 Engine control device
22 Drive motor control device
23 Brake control device 24 Vehicle-speed sensor
25 Accelerator operation quantity sensor
26 Shift sensor
27 Vehicle speed pulse signal added-up value storing unit
100 Bus

The invention claimed is:
1. A fuel-saving rating device for use in a vehicle, the fuel-saving device comprising:
a rate calculating device; and
a power amount management device connected to a gasoline-fueled engine and a motor configured to drive the vehicle, the power amount management device being connected to the rate calculating device via a bus, the power amount management device including:
a power amount storing unit configured to store: (a) an external electrical power amount indicating an amount of electrical power charged from an external device that generates electrical power without the gasoline-fueled engine in a first area, and (b) an internal electrical power amount indicating an amount of electrical power charged by electricity generated by an electrical power generator in the vehicle when the gasoline-fueled engine drives the vehicle in a second area, and
an outputting unit configured to: (i) output the external electrical power amount stored in the first area of the power amount storing unit to the rate calculating device, and (ii) output the internal electrical power amount stored in the second area of the power amount storing unit to the rate calculating device;
wherein the rate calculating device includes:
an external-electrical-power-amount storing unit configured to store the external electrical power amount which is outputted from the power amount management device;
an internal-electrical-power-amount storing unit configured to store the internal electrical power amount which is outputted from the power amount management device;
a driving-electrical-power-amount calculator configured to calculate a driving electrical power amount which indicates an amount of electrical power required for driving the vehicle, based on the external electrical power amount stored in the external-electrical-power-amount storing unit, the internal electrical power amount stored in the internal-electrical-power-amount storing unit, and an amount of electrical power the vehicle currently has;
a calculating unit configured to calculate a ratio of the external electrical power amount among the electrical power amount consumed for driving the vehicle using the driving electrical power amount calculated by the driving-electrical-power-amount calculator and the external electrical power amount stored in the external-electrical-power-amount storing unit; and
a rating unit configured to rate a fuel-saving driving of a driver based on the ratio calculated by the calculating unit.

2. The fuel-saving rating device according to claim 1, wherein
the power amount storing unit further stores a regenerative electrical power amount which is an amount of electrical power that the motor generates when the vehicle decelerates in the first area, and
the external-electrical-power-amount storing unit further stores the regenerative electrical power amount which is outputted from the power amount management device.

3. The fuel-saving rating device according to claim 1, the rate calculating device further comprising:
an additional-electrical-power-consumption calculator configured to calculate an additional electrical power consumption amount which indicates an amount of electrical power consumed by an in-vehicle device mounted on the vehicle, wherein
the calculating unit calculates the ratio of the external electrical power amount among the electrical power amount consumed for driving the vehicle using the driving electrical power amount calculated by the driving-electrical-power-amount calculator, and an amount of electrical power obtained by subtracting the additional electrical power consumption amount calculated by the additional-electrical-power-consumption calculator from the external electrical power amount stored in the external-electrical-power-amount storing unit.

4. The fuel-saving rating device according to claim 1, the rate calculating device further comprising:
an additional-electrical-power-consumption calculator configured to calculate an additional electrical power consumption amount which indicates an amount of electrical power consumed by an other in-vehicle device mounted on the vehicle, wherein
the calculating unit calculates the ratio of the external electrical power amount among the electrical power amount consumed for driving the vehicle using an amount of electrical power obtained by adding the additional electrical power consumption amount calculated by the additional-electrical-power-consumption calculator to the driving electrical power amount calculated by the driving-electrical-power-amount calculator, and the external electrical power amount stored in the external-electrical-power-amount storing unit.

5. The fuel-saving rating device according to claim 1, the rate calculating device further comprising:
an advice notifying unit configured to notify an advice of the fuel-saving driving to the driver based on a result of calculation by the calculating unit.

6. A power amount management device for connection to a gasoline-fueled engine, a motor configured to drive a vehicle, and a rate calculating device, the power amount management device comprising:
a bus connected to the rate calculating device;
a memory configured to store:
an external electrical power amount indicating an amount of electrical power charged from an external device that generates electrical power without the gasoline-fueled engine connected to the power amount management device in a first area, and
an internal electrical power amount indicating an amount of electrical power charged by electricity generated by an electrical power generator in the vehicle when the gasoline-fueled engine drives the vehicle in a second area; and
an HV traveling control device configured to determine: (i) the external electrical power amount charged from the external device connected to the vehicle and that generates electrical power without the gasoline-fueled engine, and (ii) the internal electrical power amount generated by the electrical power generator in the vehicle when the gasoline-fueled engine drives the vehicle, the HV traveling control device storing the determined external electrical power amount and the internal electrical power amount in the memory; and a processor programmed to:
output the determined external electrical power amount stored in the first area and the determined internal electrical power amount stored in the second area of the memory to the rate calculating device for calculating a rate of a fuel-saving driving of the vehicle based on the determined external electrical power and the determined internal electrical power.

* * * * *